(No Model.)
B. R. BENNER.
LIQUID METER.
No. 416,435. Patented Dec. 3, 1889.
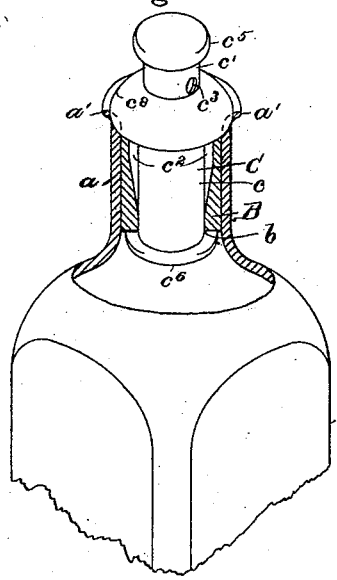
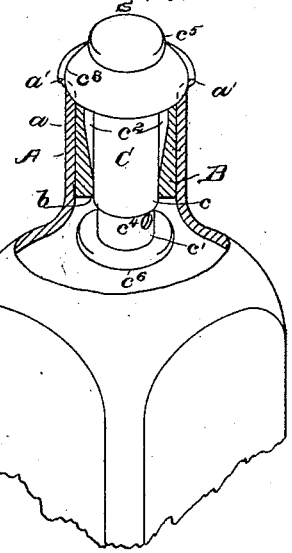
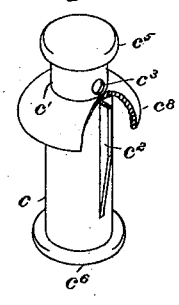
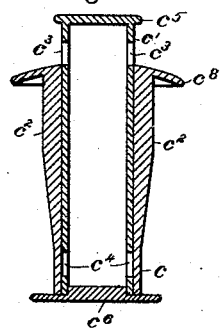
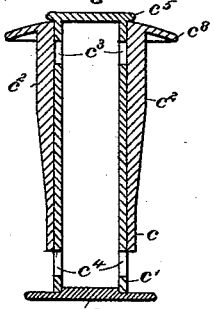
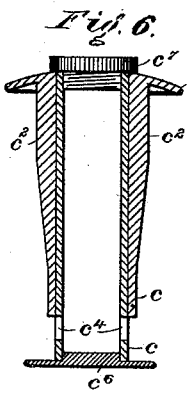
Witnesses
Kirkley Hyde
Myrtie C Beals
Inventor
Burnham R. Benner,
By Albert M. Moore,
His Attorney

UNITED STATES PATENT OFFICE.

BURNHAM R. BENNER, OF LOWELL, MASSACHUSETTS.

LIQUID-METER.

SPECIFICATION forming part of Letters Patent No. 416,435, dated December 3, 1889.

Application filed June 10, 1889. Serial No. 313,648. (No model.)

*To all whom it may concern:*

Be it known that I, BURNHAM R. BENNER, a citizen of the United States, residing at Lowell, in the county of Middlesex and Commonwealth of Massachusetts, have invented a certain new and useful Improvement in Liquid-Meters, of which the following is a specification.

My invention relates to liquid-meters, more especially those designed to draw a definite quantity from a bottle or other receptacle; and it consists in the devices and combinations hereinafter described and claimed.

In the accompanying drawings, Figure 1 is an isometric view of the upper part of a bottle with my improvement applied thereto, the neck and stopper of said bottle being in central vertical section, the inner tube of the meter being raised to close the bottle and to allow the contents of the meter to be discharged; Fig. 2 like Fig. 1, except that the inner tube of the meter is in a position to allow the liquid contained in the bottle to enter it; Fig. 3, an isometric view of the meter detached from the stopper, a part of the flange of the outer tube of the meter being broken away to show the fin or spline, the inner tube of the meter being raised within the outer; Fig. 4, a central vertical section of the meter detached, its parts being in a position to discharge its contents; Fig. 5, a section similar to that shown in Fig. 4, the parts being in a position to allow the meter to be filled from the receptacle to which the meter is applied; Fig. 6, a vertical central section of a modified form of the meter, provided with a screw cap or plug to enable the meter to be discharged of its contents through its end instead of through its sides.

A is a bottle of any usual form, having a neck $a$ and head $a'$; B, the cork or other stopper, provided with a central opening $b$ to receive the meter. The meter C consists of two tubes $c$ $c'$, the outer one $c$ of which is shorter than the other and open at both ends, and is provided on one or more sides with fins or splines $c^2$, which prevent it from turning in the stopper B. The inner tube $c'$ has a sliding fit in the outer tube $c$, and is provided near its outer and inner ends with lateral holes $c^3$ $c^4$, arranged in two sets in planes at right angles to the axis of said inner tube, the distance between these two sets of holes being so much less than the length of the outer tube that the latter tube always closes entirely one set of holes, the ends of the inner tube being closed and provided with external annular flanges $c^5$ $c^6$ of sufficient diameter to prevent the inner tube from being removed from the outer tube, and the distance between each flange and the set of holes nearest it being less than the length of the outer or shorter tube $c$, so that the liquid in the bottle or other receptacle can only be discharged by passing into the holes $c^4$ nearest the inner end of the inner tube and afterward passing out through the holes $c^3$ nearest the outer end of said inner tube and beyond the outer end of the outer tube. The capacity of the inner tube is a definite quantity, as a fluid ounce or other quantity.

In use the inner tube $c'$ is pushed in far enough to close the holes $c^3$ and open the holes $c^4$, and the bottle is inverted or tipped up far enough to allow the contents of the bottle to fill the inner tube, and the inner tube is then drawn out, closing the inner holes $c^4$ and opening the other set of holes $c^3$ and allowing the contents of the inner tube to be discharged through said last-named holes, neither set of holes being opened until the other set is entirely closed. Obviously the meter may be inserted into an opening in the head or wall of a vessel—as a cask, barrel, or tank—below the surface of the fluid therein contained, and be used to draw a definite quantity of such fluid at each operation of said meter.

In the modified form shown in Fig. 6 the holes $c^3$ are omitted and the fluid is drawn through the end of the inner tube $c'$ after said tube has been filled and drawn outward, as above described, and after removing a screw cap or plug $c^7$ of any usual form. In this form of my invention a continuous stream may be drawn from the receptacle when the inner tube is pushed inward and the screw-cap removed. The edges of the cap or plug $c^7$ extend beyond the outer tube and serve the purpose of the flange $c^5$, above described, and are also milled to enable the same to be grasped by the fingers and turned.

The outer tube $c$ may be provided at or near its outer end with an annular flange $c^8$, which serves to some extent to support the fins $c^2$, but is mainly to conceal the cork or other stopper and for ornamentation.

I claim as my invention—

1. The combination of two tubes arranged one within the other, the outer of said tubes being adapted to be inserted in a hole through the stopper or wall of a vessel, and the inner tube being adapted to fit and slide in said outer tube and having closed ends and two sets of lateral openings arranged nearer together than the length of said outer tube, the distance between each end of said inner tube and the nearest of said openings being less than the length of said outer tube, said inner tube having a definite capacity, as and for the purpose specified.

2. The combination of two tubes, one having a sliding fit within the other, said inner tube being longer than said outer tube and having at its ends external projections or flanges to retain said inner tube within said outer tube, and having lateral openings arranged at a distance from each other less than the length of said outer tube, the distance between each end of said tube and the opening nearest it being less than the length of said outer tube, as and for the purpose specified.

3. The combination of two tubes, one having a sliding fit within the other, the outer one of said tubes having splines, and the inner tube having closed ends and lateral openings arranged at a distance from each other less than the length of said outer tube, and the distance of each end of said inner tube from the nearest of said openings being less than the length of said outer tube, as and for the purpose specified.

In witness whereof I have signed this specification, in the presence of two attesting witnesses, this 5th day of June, A. D. 1889.

BURNHAM R. BENNER.

Witnesses:
ALBERT M. MOORE,
MYRTIE C. BEALS.